United States Patent [19]

Kobori et al.

[11] Patent Number: 4,835,619
[45] Date of Patent: May 30, 1989

[54] ORIGINAL READING APPARATUS

[75] Inventors: Masao Kobori, Mishima; Norio Takita, Shizuoka; Hideaki Fukushima, Mishima, all of Japan

[73] Assignee: Tokyo Electric Co., Ltd., Tokyo, Japan

[21] Appl. No.: 211,968

[22] Filed: Jun. 27, 1988

[30] Foreign Application Priority Data

Jul. 2, 1987 [JP] Japan .................. 62-165872

[51] Int. Cl.$^4$ ............................. H04N 1/024
[52] U.S. Cl. .................. 358/294; 358/293; 358/213.13; 250/578
[58] Field of Search ........... 358/256, 280, 293, 285, 358/213.13; 383/294; 179/100; 250/578

[56] References Cited

U.S. PATENT DOCUMENTS 4,707,618 11/1987 Hosaka .................. 358/294
4,707,747 11/1987 Rockwell, III .......... 358/294
4,729,036 3/1983 Ikeda et al. ............ 358/285

FOREIGN PATENT DOCUMENTS 58-96453 6/1983 Japan .................. 358/294
62-2535 1/1987 Japan .

Primary Examiner—Edward L. Coles, Sr.
Attorney, Agent, or Firm—Frishauf, Holtz, Goodman & Woodward

[57] ABSTRACT

In an original reading apparatus for causing a paper feed roller to feed an original inserted into an original insertion port of a main body cover to an image sensor unit, irradiating the original with light from the sensor unit, receiving light reflected by the original, and reading an image on the original, roller support bearings are mounted on a sensor housing for the sensor unit to support the paper feed roller.

6 Claims, 14 Drawing Sheets

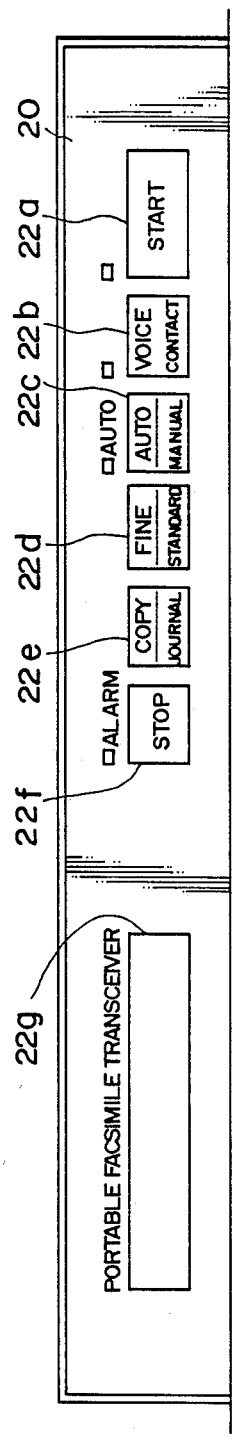
F I G. 7

ORIGINAL READING APPARATUS

BACKGROUND OF THE INVENTION

1. Field of the Invention

The present invention relates to an original reading apparatus used in, e.g., a facsimile.

2. Description of the Related Art

In a conventional image reading apparatus of this type, an original inserted into an original insertion port of a main unit cover is fed to an image sensor unit by a paper feed roller, the original is irradiated with light in the sensor unit, and light reflected by the original is received to read an image, such as characters, figures, or drawings on the original.

In a conventional original reading apparatus, the paper feed roller and the sensor unit are separately mounted on a chassis disposed inside the main body cover. Therefore, a length of a paper feed path between the feed roller and the sensor unit is increased, and a compact reading apparatus cannot be obtained.

A long paper-feed path causes a plurality of occurrence of jamming or inclination (skew) of an original in the path to increase. In addition, a time required for a preparatory step (standby step) for reading an original is undesirably prolonged.

SUMMARY OF THE INVENTION

The present invention has been made in consideration of the above situation, and has as its object to provide a simple, compact original reading apparatus capable of reducing the probability of occurrence of jamming and skew of an original and shortening the standby time for reading an original.

In order to achieve the above object of the present invention, there is provided an original reading apparatus wherein roller support means for supporting a paper feed roller is mounted on a sensor housing for a sensor unit.

With the novel structure described above, the paper feed path between the paper feed roller and the sensor unit can be shortened, and therefore a compact apparatus can be obtained.

In addition, occurrence of jamming and skew of an original can be suppressed, and the standby time for reading an image, such as figures, characters, or drawings on an original, can be reduced.

The novel structure described above is simpler and more compact than that of the conventional original reading apparatus.

BRIEF DESCRIPTION OF THE DRAWINGS

FIG. 7 is a schematical plan view of an operation panel in the facsimile in FIG. 1;

DETAILED DESCRIPTION OF THE PREFERRED EMBODIMENT

An embodiment of the present invention will be described with reference to the accompanying drawings.

Figure 1:
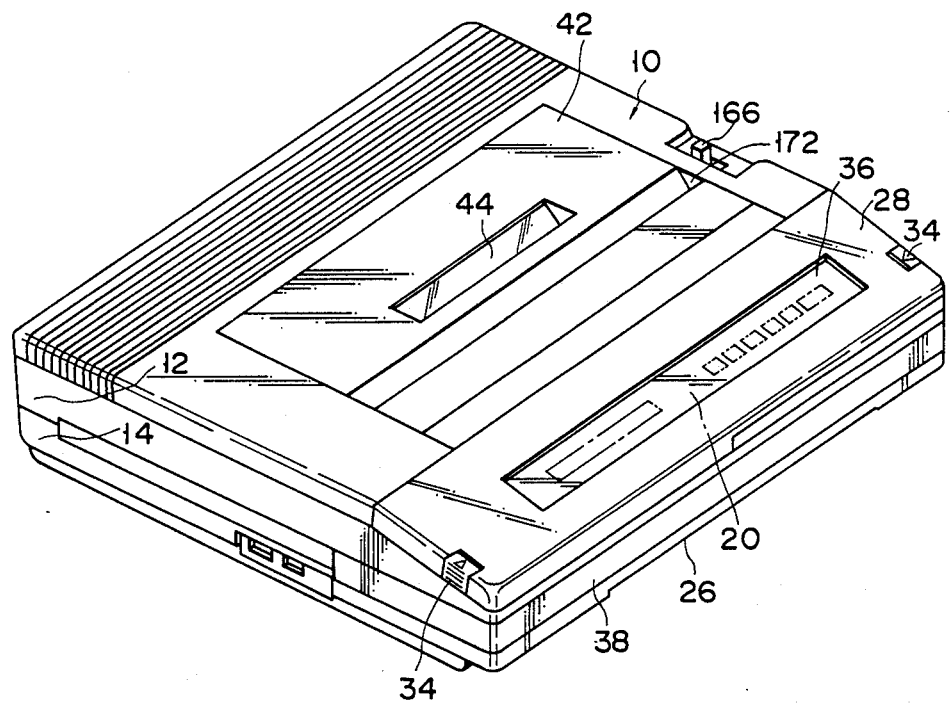
FIG. 1 is a perspective view schematically showing an outer appearance of a facsimile which employs an original reading apparatus according to an embodiment of the present invention.
Figure 6:
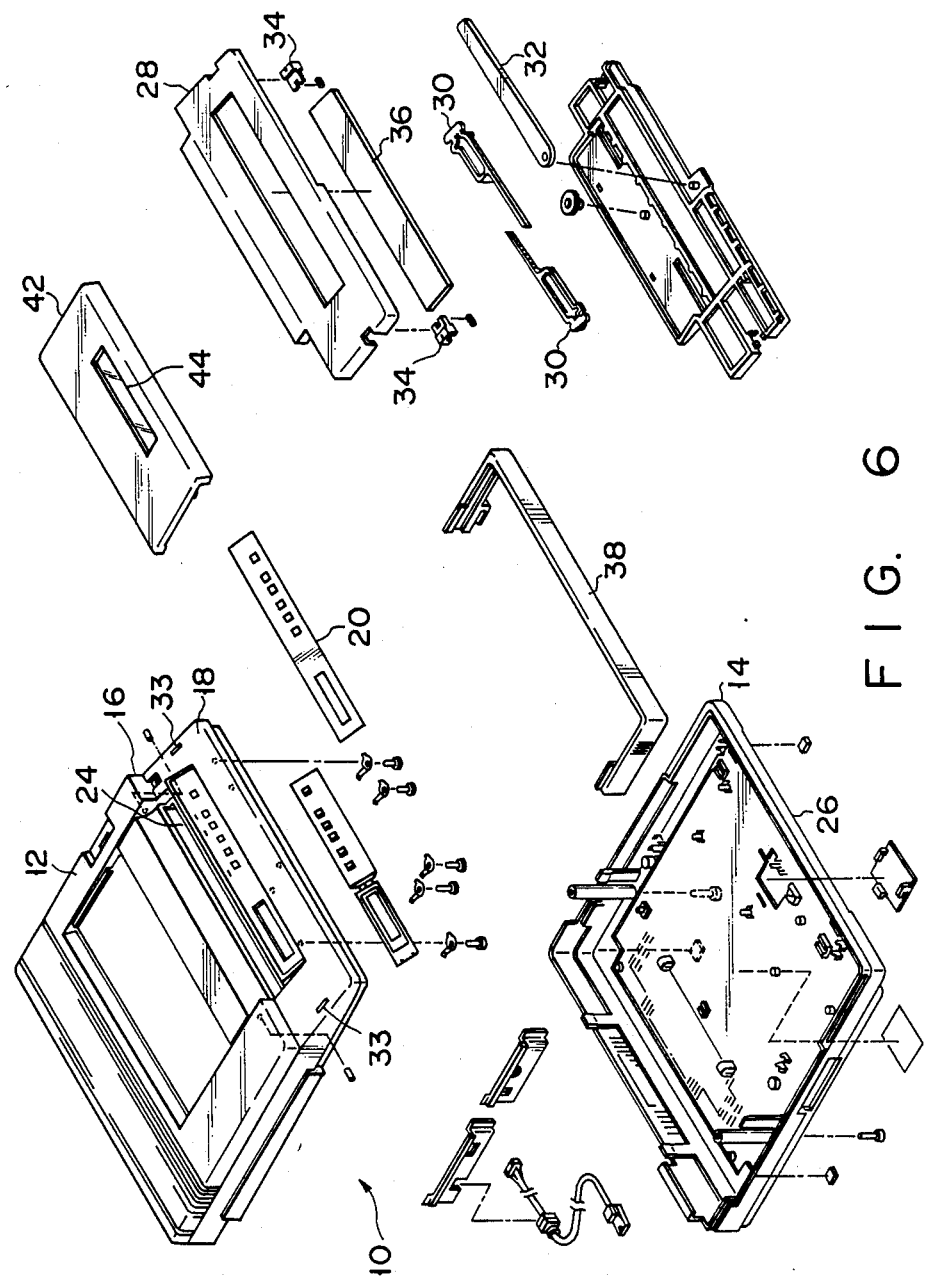
FIG. 6 is an exploded perspective view schematically showing the construction of a main body cover and the original-supporting table in the facsimile shown in FIG. 1.

FIG. 1 shows an outer appearance of a facsimile which employs an original reading apparatus according to an embodiment of the present invention. Reference numeral 10 denotes a main body cover of the facsimile. Main body cover 10 comprises upper and lower cover members 12, 14 both of which are made of synthetic resin, as shown in FIG. 6. Step 16 is formed at the front portion of the upper surface of upper cover member 12. Operation panel 20 is arranged on the upper surface of step area 18. Operation panel 20 includes start key 22a, voice contact key 22b, auto/manual reception selection key 22c, sending mode key (fine/standard) 22d, copy-/journal selection key 22e, and stop key 22f as shown in FIG. 7. Operation panel 20 also includes liquid crystal display means 22g. Original insertion port 24 is formed behind operation panel 20 on the upper surface of step area 18. Original discharge port 26 is formed at the lower portion of the front surface of lower cover 14.

Figure 2:
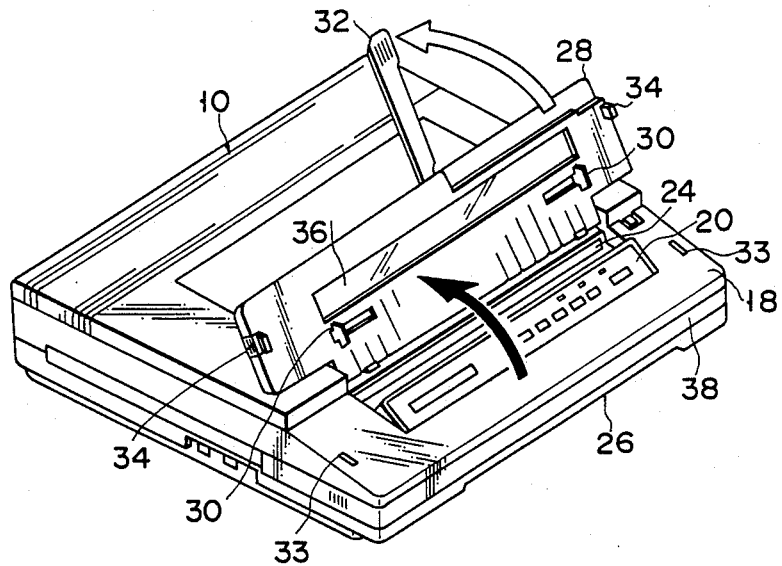
FIG. 2 is a perspective view schematically showing the outer appearance of the facsimile in FIG. 1 when an original-supporting table is elevated.

As shown in FIGS. 1 and 6, lid 28 is openably disposed at the front portion of the upper surface of main body cover 10 to cover or expose step area 18. Lid 28 also serves as an original-supporting table for supporting an original in the sending mode. As shown in FIGS. 2 and 6, a pair of original guides 30 are mounted on the lower surface of lid 28 and is slidable along the widthwise direction of paper. One end of original-supporting member 32 is pivotally supported at the center of the distal end of lid 28, and original-supporting member 32 is drawn out from lid 28 to support the upper end portion of an original supported on the lower surface of elevated lid 28. When original-supporting member 32 is not used, it is accommodated in a recess at the distal end portion on the lower surface of lid 28. A pair of lock members 34 are mounted at both sides of lid 28 so as to engage with a pair of lock holes 33 formed in the upper surface of step area 18. Transparent window 36 is formed at the central portion of lid 28 to allow an operator to observe operation panel 20 even if original-supporting table or lid 28 is kept closed, as shown in FIG. 1.

Figure 4:
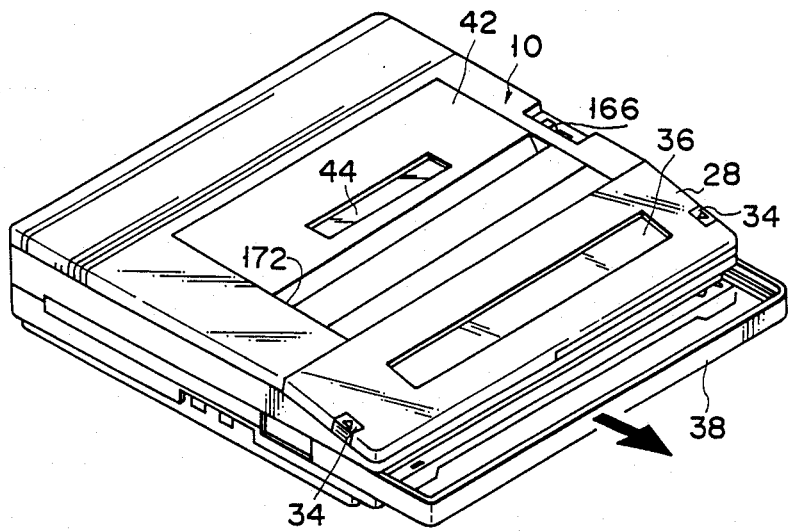
FIG. 4 is a perspective view schematically showing the outer appearance of the facsimile in FIG. 1 when a handle is pulled out.
Figure 5:
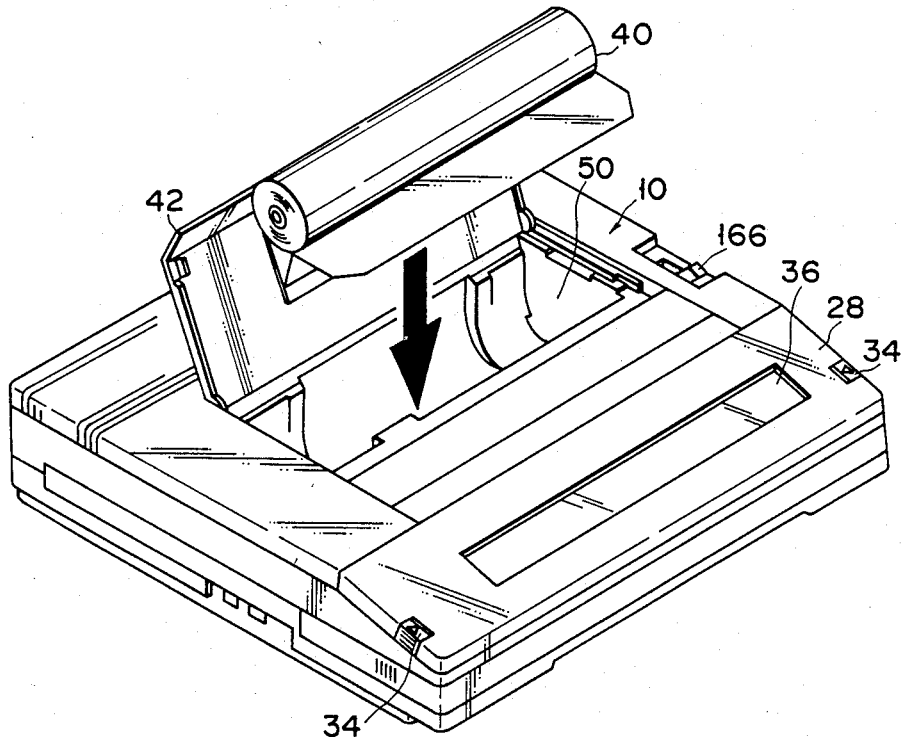
FIG. 5 is a perspective view schematically showing the outer appearance of the facsimile in FIG. 1 when recording paper is replenished.

Carrying handle 38 is retractably attached to the front surface of main body cover 10, as shown in FIG. 4. Opening/closing cover 42 is pivotally mounted at the central portion of the upper surface of main body cover 10 to allow replenishment of a roll of heat-sensitive recording paper 40, as shown in FIG. 5. Transparent window 44 is formed in opening/closing cover 42. Transparent cover 44 allows the operator to check a remaining amount of recording paper 40 even if opening/closing cover 42 is kept closed.

Figure 8:
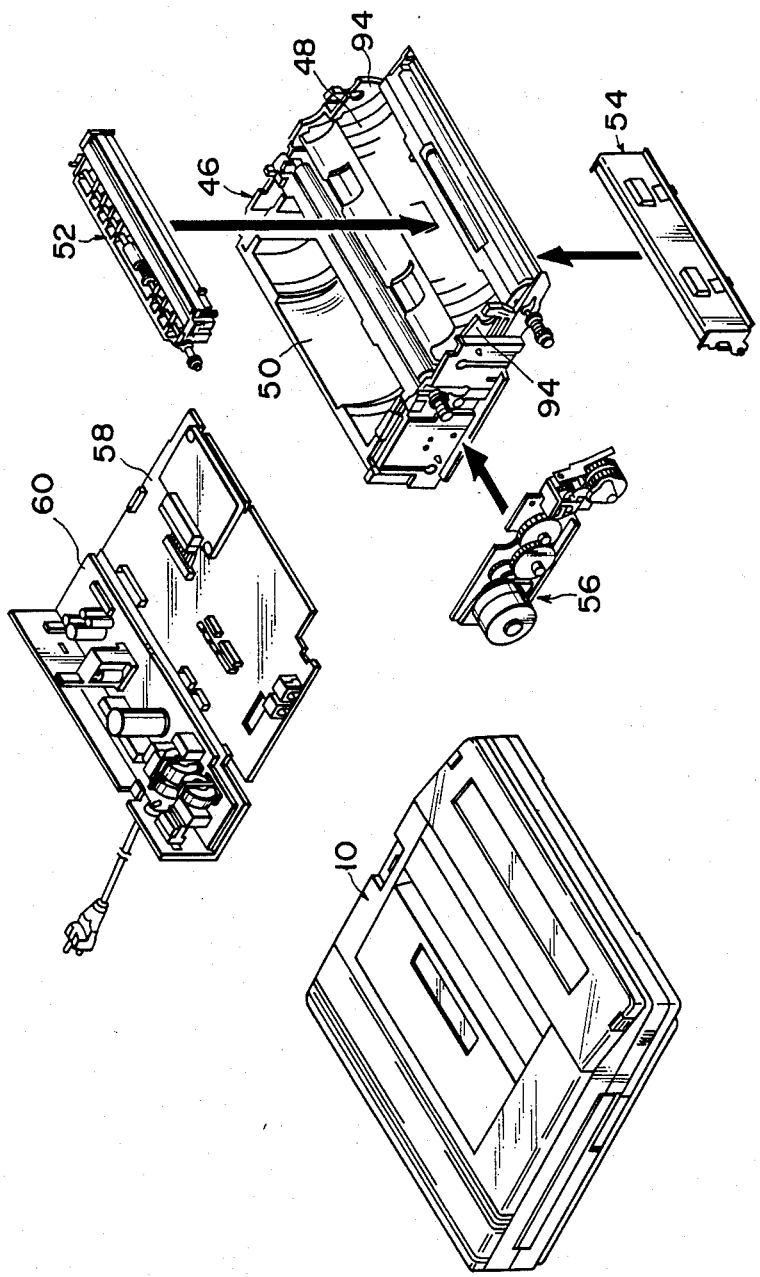
FIG. 8 is an exploded perspective view schematically showing component members housed in the main body cover of the facsimile shown in FIG. 1.

Main body frame 46 made of synthetic resin is housed inside main body cover 10, as shown in FIG. 8. Arcuated original guide wall 48 is formed at the front portion of main body frame 46. Recording paper storage recess 50 is formed at the rear portion of frame 46 to store recording paper 40. Original reading sensor unit 52 is mounted on the upper surface of original guide wall 48 of main body frame 46. Printing unit 54 is mounted behind original guide wall 48. Drive mechanism unit 56 is mounted on one side surface of main body frame 46. Main body frame 46 mounted with these units constitute a main body of the facsimile. Printed circuit board 58 and power source circuit unit 60 are housed below and behind main bodyframe 46 in main body cover 10.

Figure 10:
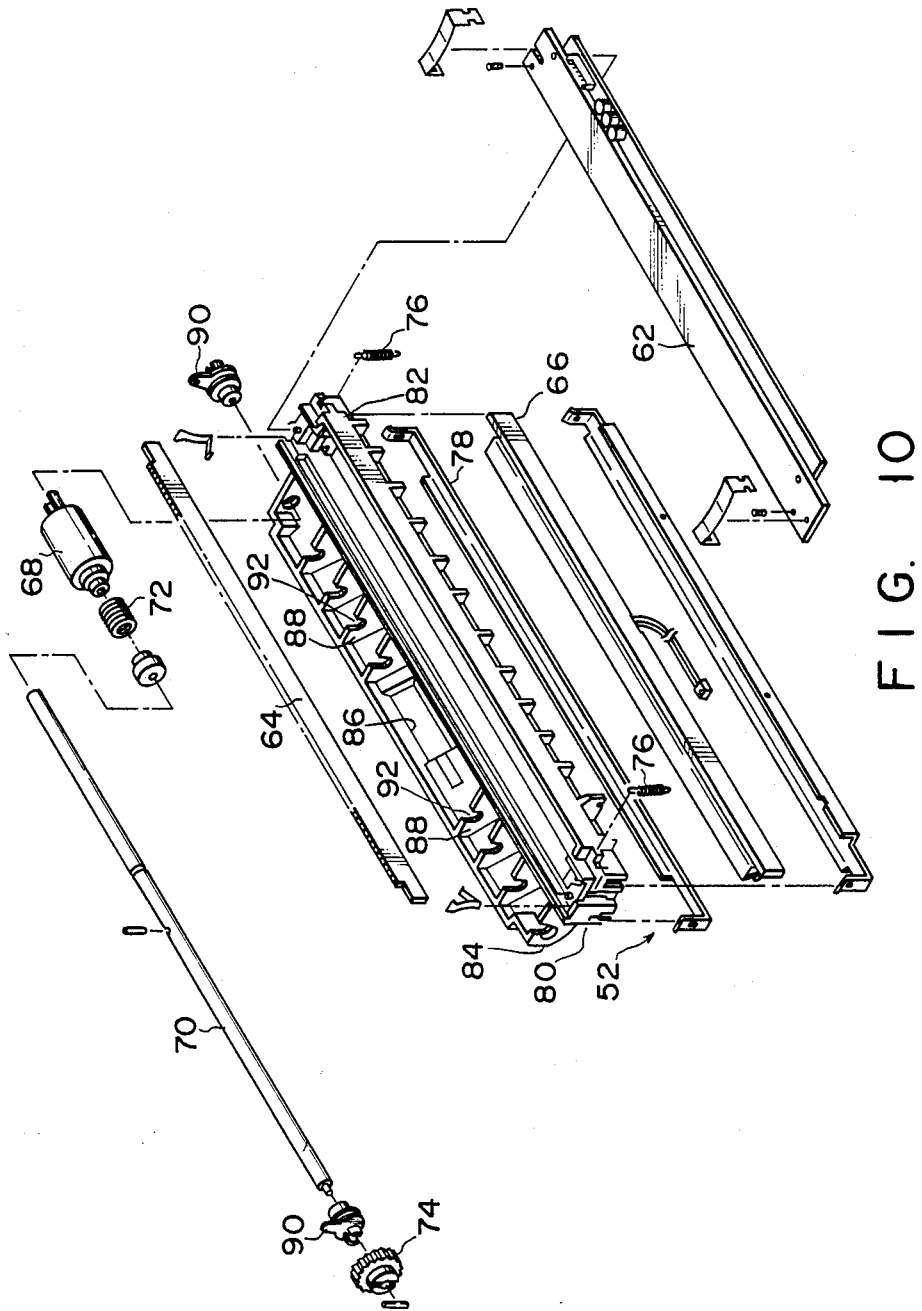
FIG. 10 is an exploded perspective view schematically showing an original reading unit mounted on the main body frame in FIG. 9 and integrated with the paper feed roller.

As shown in FIG. 10, original reading sensor unit 52 includes contact type image sensor 62, rod lens assembly 64, LED assembly 66, paper feed roller 68, paper feed roller shaft 70, one-way clutch 72, paper feed roller drive gear 74, spring 76, abutment member 78, and sensor housing 80. Sensor unit 52 is pivotally mounted on main body frame 46 through paper feed roller shaft 70.

More specifically, sensor housing 80 comprises first support 82 having a substantially rectangular shape and open to the upper and lower surfaces, and elongated second support 84, which is formed integrally with the rear edge of first support 82 to extend along the longitudinal direction of first support 82 and the upper surface of which is open.

First and second supports 82 and 84 are integrally formed of a fiber-reinforced synthetic resin.

First support 82 supports main constituting members for the original reading apparatus, such as contact type image sensor 62, rod lens assembly 64, LED assembly 66, spring 76, and abutment member 78.

The lower surface of second support 84 is arcuated in correspondence with the arcuated upper surface of original guide wall 48. Roller exposing opening 86 is formed at the central portion of second support 84 such that a longitudinal axis of opening 86 is aligned with the longitudinal direction of support 84. A plurality of reinforcing ribs 88 are formed on the inner surface of second support 84 and are spaced apart from each other in the longitudinal direction of support 84. Paper feed roller support means, e.g., bearings 90 are mounted on the both side walls of second support 84. Bearings 90 support paper feed roller shaft 70 to make it parallel to the lower surface of support 84. Notches 92 for receiving paper feed roller shaft 70 are respectively formed in the plurality of reinforcing ribs 88 at positions located on a line connecting the pair of paper feed roller support means 90.

One-way clutch 72 and paper feed roller 68 are mounted at the central portion of paper feed roller shaft 70. Paper feed roller 68 receives a rotational force from paper feed roller shaft 70 through one-way clutch 72. When paper feed roller shaft 70 is supported by the pair of paper feed roller support means 90, paper feed roller 68 is located in roller exposing opening 86 of second support 84 of sensor housing 80 and is exposed from the arcuated lower surface of second support 84.

The pair of paper feed roller support means 90 are also supported by both side walls 94 (FIGS. 8 and 9) located at both sides of original guide wall 48 of main body frame 46. Therefore, sensor housing 80 can be pivoted about the pair of paper feed roll support means 90, or about paper feed roller shaft 70 inserted through the paired supports 90, between a contact position where the lower surface of first support 82 is close to original guide wall 48 and a separated position where the lower surface is located far away from original guide wall 48 in a space defined by original guide wall 48 of main body frame 46 and both side walls 94.

The plurality of reinforcing ribs 88 of second support 84 of sensor housing 80 slightly project downward from the lower surface of second support 84. When sensor housing 80 is located in the contact position, the downwardly projected portions of the plurality of reinforcing ribs 88 cooperate with original guide wall 48 of main body frame 46 to slidably contact the original inserted in original insertion port 24 of cover member 12, and serve as original guides for guiding the original into an original path defined between the lower surface of first support 82 of sensor housing 80 and original guide wall 48.

Paper feed roller drive gear 74 is attached to one end of paper feed roller shaft 70 projected outside of corresponding one of the paired paper feed roller support means 90 supporting roller shaft 70.

Figure 9:
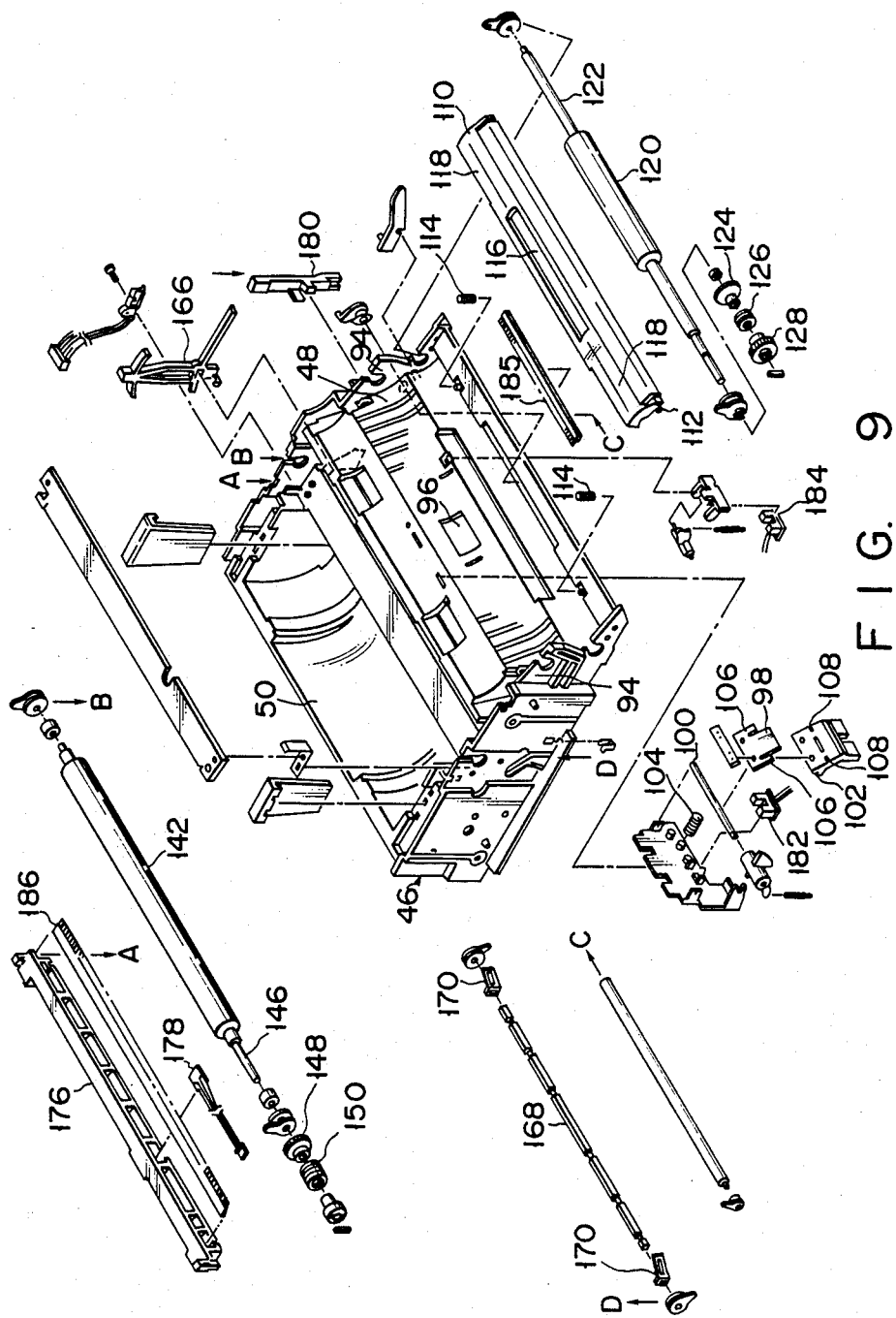
FIG. 9 is an exploded perspective view schematically showing various members mounted on a main body frame in the main body cover in the facsimile shown in FIG. 1.
Figure 14:
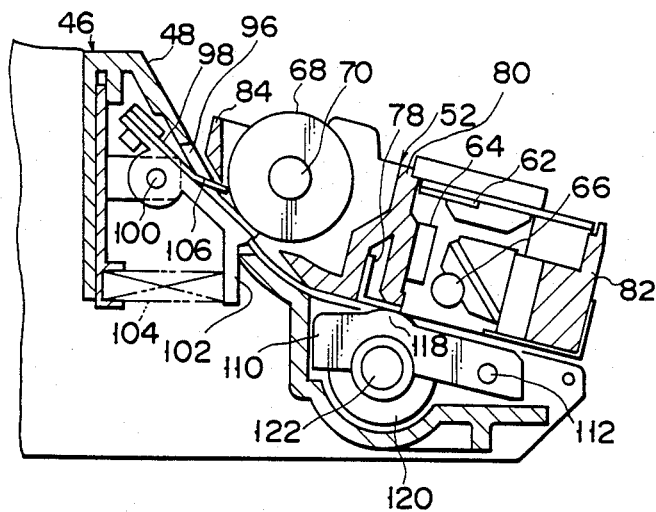
FIG. 14 is a longitudinal sectional view schematically showing a vicinity of a friction plate arranged to oppose the paper feed roller integrated with the original reading unit in the main body frame in FIG. 9.

Opening 96 is formed in original guide wall 48 at a position corresponding to paper feed roller 68 supported by sensor housing 80, as shown in FIGS. 9 and 14. Elastic friction plate 98 shown in FIG. 9 is mounted in opening 96. Friction plate 98 applies frictional resistance to the plurality of originals inserted from original insertion port 24 of upper cover member 12 to make the originals being fed one by one by paper feed roller 68 toward the lower surface of second support 84 of sensor housing 80. Friction plate 98 is fixed to friction plate mounting member 102 mounted to main body frame 46 so as to be swingable about shaft 100. Friction plate 98 is urged by spring 104 to come close to paper feed roller 68, as shown in FIG. 14. Tongues 106 are integrally formed with both sides of friction plate 98, respectively. Tongues 106 are elastically deformed to come close to paper feed roller 68 by a pair of projections 108 mounted on the upper surface of friction plate mounting member 102, as shown in FIG. 14.

White guide plate 110 is disposed along the lower end of original guide wall 48 of main body frame 46. White guide plate 110 is supported on main body frame 46 so as to be pivotal about pin 112. White guide plate 110 is biased to be pivotal upward by coil spring 114 mounted on the lower surface side of plate 110. Opening 116 is formed at the central portion of the upper surface of white guide plate 110 and extends along the longitudinal direction of plate 110. Projections 118 each having a height slightly larger than the thickness of the original are formed at the both sides of opening 116 on the upper surface of white guide plate 110 to extend along the widthwise direction of the original.

Spring 76 (FIG. 9) in sensor housing 80 of original reading sensor unit 52 is hooked with main body frame 46. A spring force of spring 76 urges white guide plate 110 downward against a biasing force of coil spring 11 located below white guide plate 110 while abutment member 78 (FIG. 9) of sensor housing 80 abuts against projections 118 on white guide plate 110.

White roller 120 pivotally supported by the pair of side walls 94 of main body frame 46 is exposed in central opening 116 of white guide plate 110. The length of white roller 120 is smaller than the minimum width of the original inserted from original insertion port 24 (FIG. 2) of upper cover member 12. Abutment member 78 of sensor housing 80 which is biased downward by spring 76 (FIG. 9) also abuts against white roller 120.

As shown in FIG. 14, projections 118 are urged against abutment member 78 of second support 84 of sensor housing 80 by a biasing force of coil spring 114 to prevent skew of the original fed from original insertion port 24 by paper feed roller 68 to a contact line between projections 118 and abutment member 78. At the same time, a distance between the original and image sensor 62 on second support 84 is kept constant.

One-way clutch 126 combined with free-rotation drive gear 124 and direct drive gear 128 are attached at a one end portion of roller shaft 122 of white roller 120. This one end portion outwardly projects from side wall 94 of main body frame 46.

Figure 11:
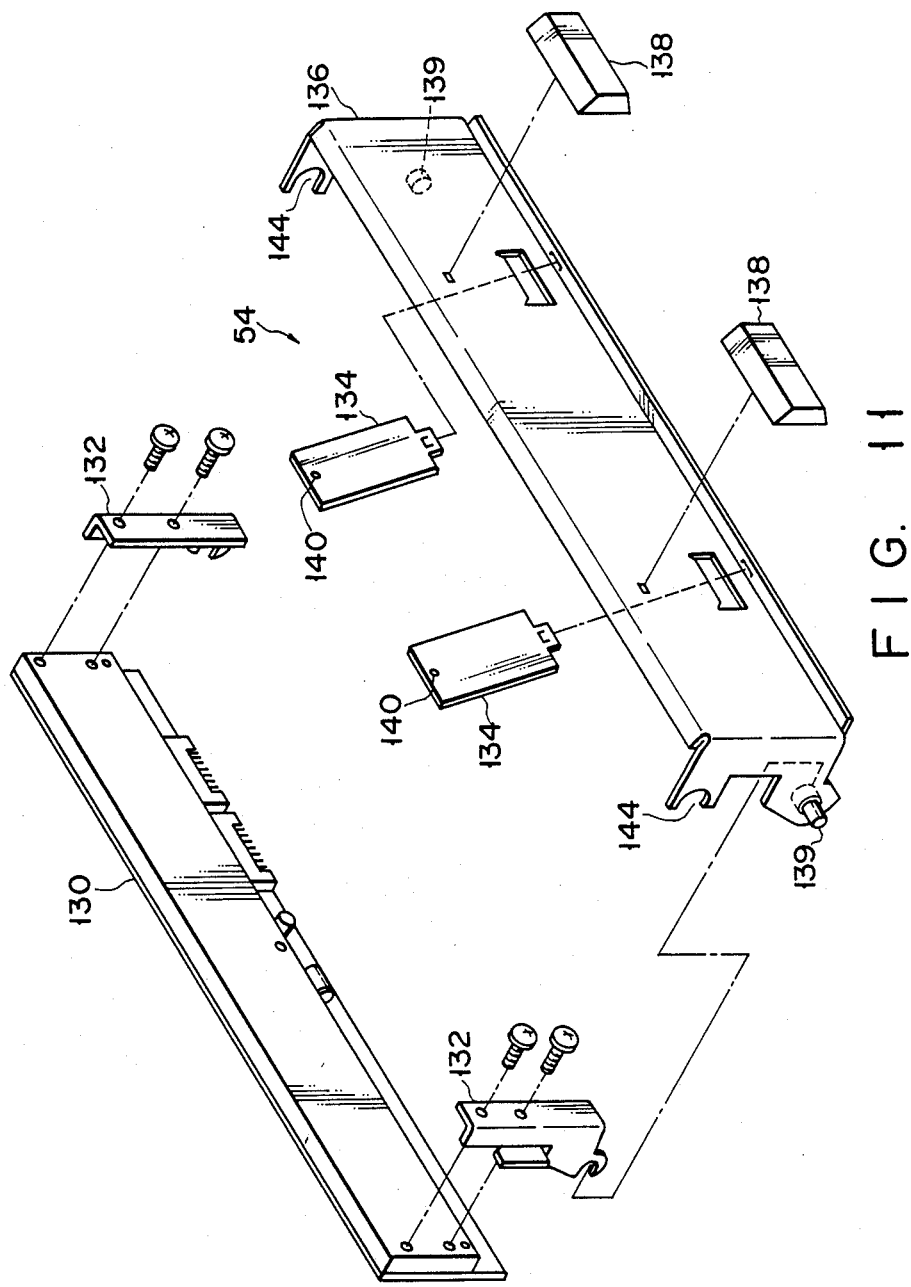
FIG. 11 is an exploded perspective view schematically showing a printing unit mounted on the main body frame shown in FIG. 9.

Printing unit 54 shown in FIG. 8 includes thermal head 130, head support members 132, leaf springs 134, head press plate 136, and spacers 138, as shown in FIG. 11. Printing unit 54 is supported by main body frame 46 through pins 139 outwardly projecting from both side portions of head press plate 136. Thermal head 130 is swingably held by head press plate 136 through head support members 132. Leaf springs 134 are fixed to head press plate 136. Each projection 140 is integrally formed on corresponding leaf spring 134. When projections 140 are brought into contact with a rear surface of thermal head 130, thermal head 130 is brought into tight contact with platen roller 142 (FIG. 9) rotatably supported by main body frame 46. Spacers 138 are fixed to a rear surface of head press plate 136. Spacers 138 are used to engage locking recesses 144 formed at both side portions of head press plate 136 with platen shaft 146 (FIG. 9) of platen roller 142. One-way clutch 150 combined with platen gear 148 is mounted at a one end portion of platen shaft 146 of platen roller 142 outwardly projecting from one side wall 94 of main body frame 46.

Figure 12:
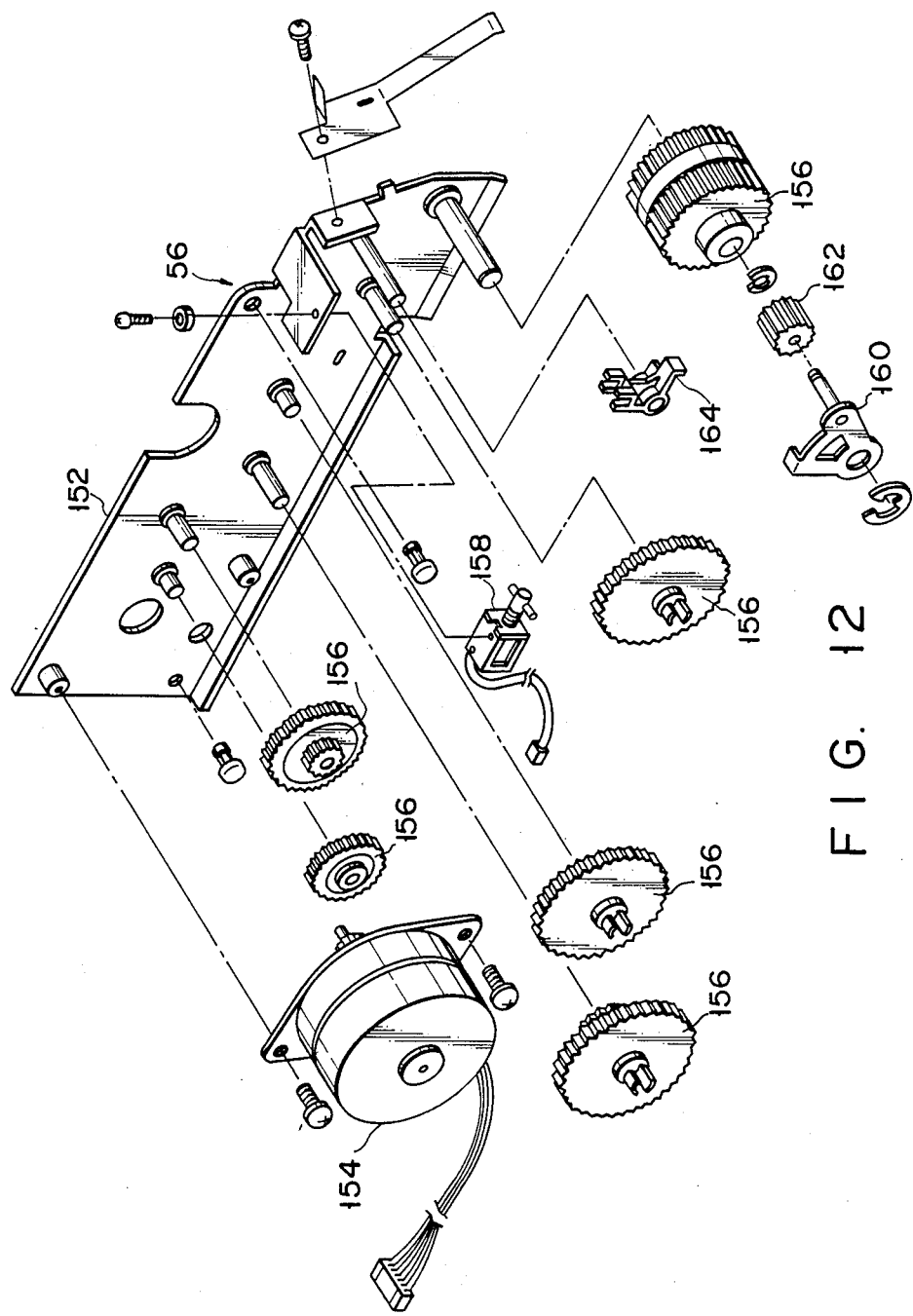
FIG. 12 is an exploded perspective view schematically showing a drive mechanism unit mounted on the main body frame shown in FIG. 9.
Figure 16:
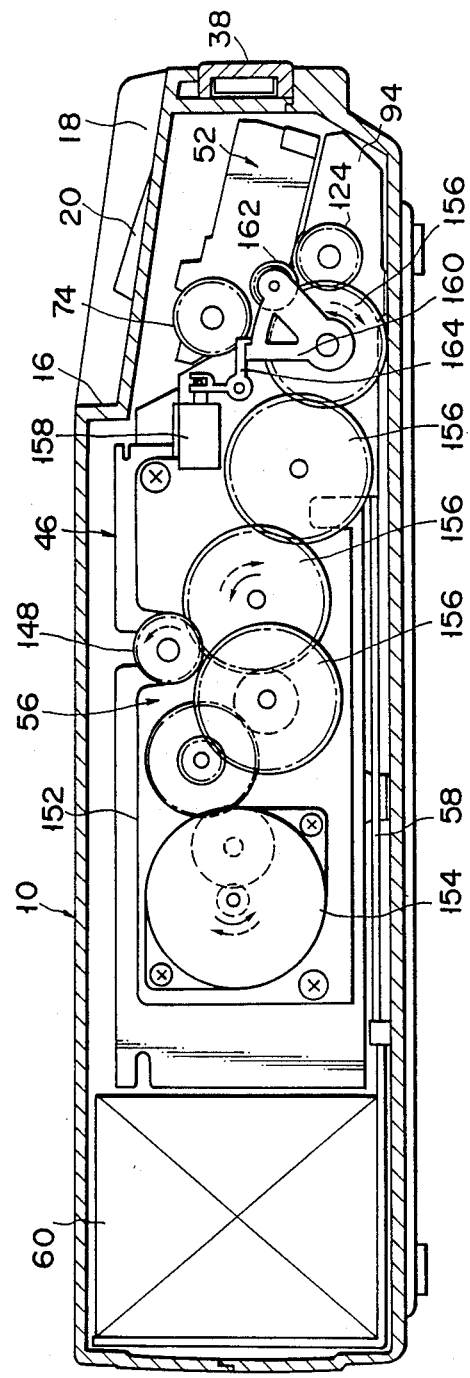
FIG. 16 is a longitudinal sectional view of the facsimile in FIG. 1 to schematically show the drive mechanism unit mounted on the side surface of the main body frame in FIG. 9.

Drive mechanism unit 56 shown in FIG. 8 includes unit mounting plate 152, bi-directional pulse motor 154, gear mechanism 156, and solenoid 158, as shown in FIGS. 12 and 16. A driving force from the output shaft of pulse motor 154 is transmitted to paper feed roller drive gear 74 (FIG. 10), free-rotation drive gear 124 (FIG. 9) for white roller 120, and platen gear 148 (FIG. 9) through gear train 156. In gear train 156, planetary gear support member 160 is rotatably mounted on the shaft of the last gear meshed with free-rotation drive gear 124 for white roller shaft 122. Planetary gear 162 supported by planetary gear support member 160 moves on the last gear in a direction corresponding to a rotational direction of the last gear to a position where planetary gear 162 is meshed with paper feed roller drive gear 74 or direct drive gear 128 for white roller 120. Stopper 164 is mounted on unit mounting plate 152 so as to selectively prevent the movement of planetary gear 162 to a position where the gear is meshed with direct drive gear 128. Stopper 164 is driven by plunger/solenoid driving unit 128. When a stop mode is set in a facsimile, as shown in FIG. 16, stopper 164 is engaged with planetary gear support member 160 so as to locate planetary gear 162 between paper feed roller drive gear 74 and direct drive gear 128 for white roller 120.

Figure 17:
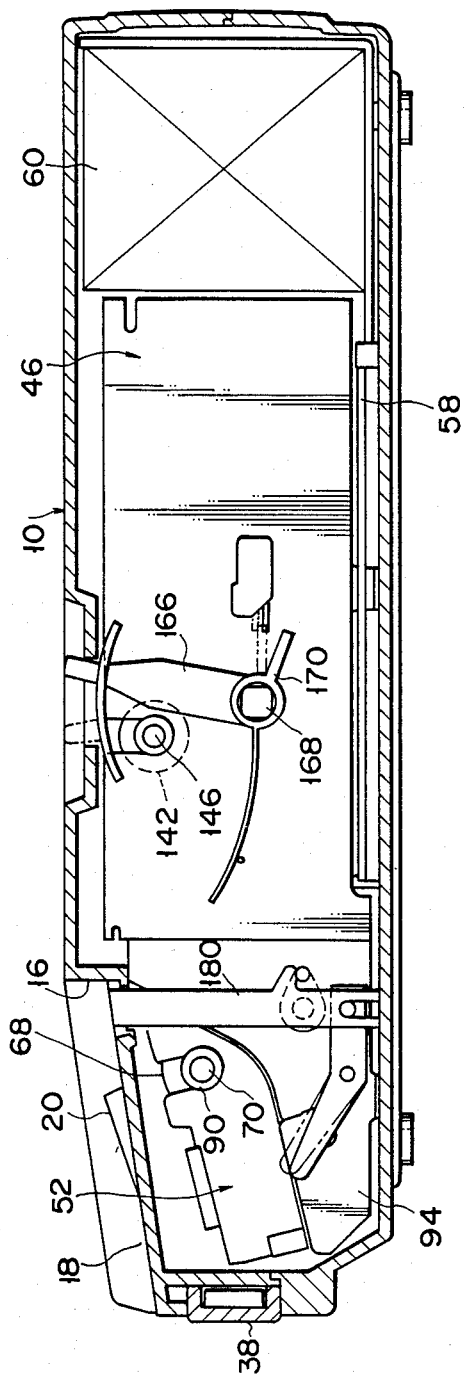
FIG. 17 is a longitudinal sectional view of the facsimile in FIG. 1 to show a side surface of the main body frame which is located at a position opposite to the side surface on which the drive mechanism unit is mounted, as shown in FIG. 16.

Head release lever 166 is arranged on the other side wall 94 of main body frame 46, as shown in FIGS. 9 and 17. Head release lever 166 is mounted on rectangular shaft 168 rotatably supported by both side walls 94 of main body frame 46. When head release lever 166 moves in one or the other direction, head push-up member 170 actuates printing unit 54 (FIGS. 8 and 11) so that thermal head 130 (FIG. 11) is brought into contact with or separated from platen roller 142.

Figure 13:
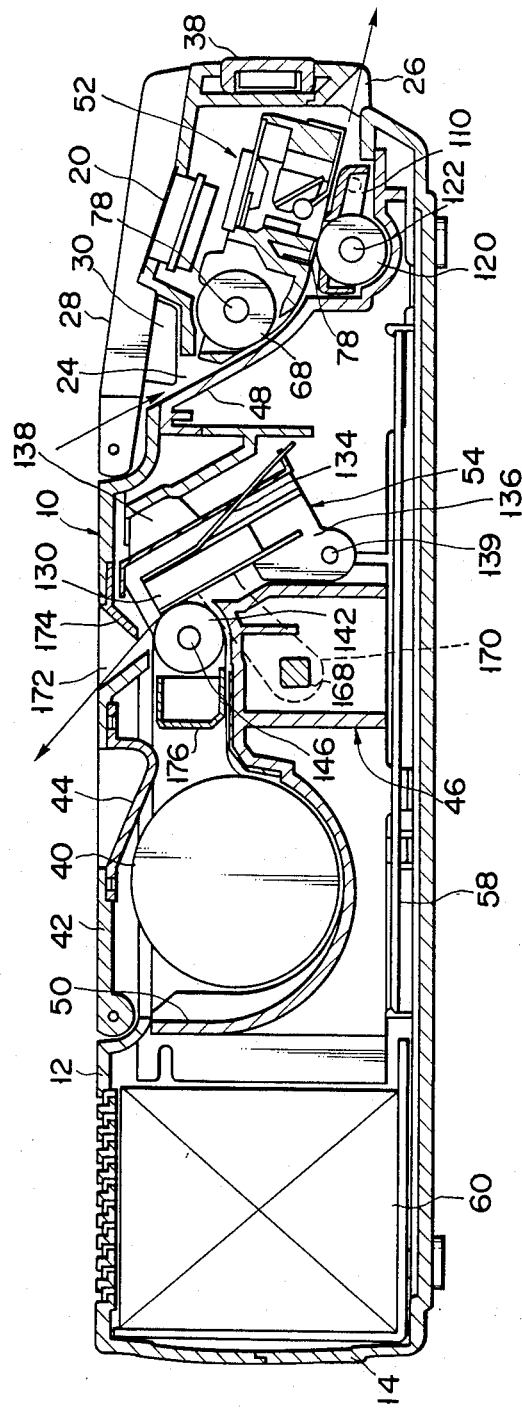
FIG. 13 is a longitudinal sectional view schematically showing an internal structure of the facsimile shown in FIG. 1.
Figure 15:
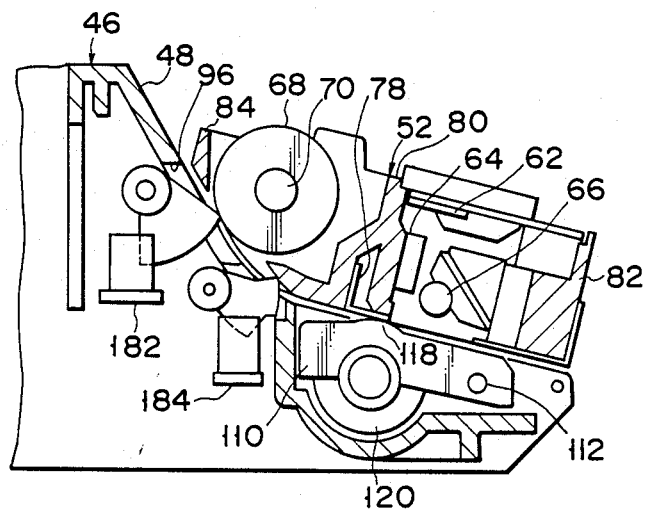
FIG. 15 is a longitudinal sectional view schematically showing a vicinity of a paper sensor arranged along a paper feed path in the main body frame in FIG. 9.

Recording paper discharge port 172 is formed at a portion of upper cover member 12 corresponding to platen roller 142, as shown in FIG. 13. Cutter 174 is disposed along a longitudinal edge of recording paper discharge port 172. Dust collection case 176 is disposed along platen roller 142 at the side opposite to thermal head 130 so as to collect dust produced when recording paper 40 is cut by cutter 174. Recording paper detection sensor 178 is arranged on a lower surface of dust collection case 176 to detect the presence/absence of recording paper 40 on platen roller 142, as shown in FIG. 9. Referring to FIG. 9, reference numeral 180 denotes a sensor unit push-up portion. When jamming of an original occurs between original sensor unit 52, white roller 120, and white guide plate 110, sensor unit push-up portion 180 causes sensor unit 52 to pivot upward against a biasing force of springs 76. Reference numerals 182 and 184 denote detection sensors for detecting an original. They detect the presence/absence of an original at upper and lower edges of original guide wall 48, i.e., in spaces immediately before paper feed roller 68 and white roller 120, as shown in FIG. 15. Reference numerals 185 and 186 denote discharge brushes. They discharge the original and the recording paper at original and recording paper discharge ports 26 and 172 of main body cover 10.

Figure 3:
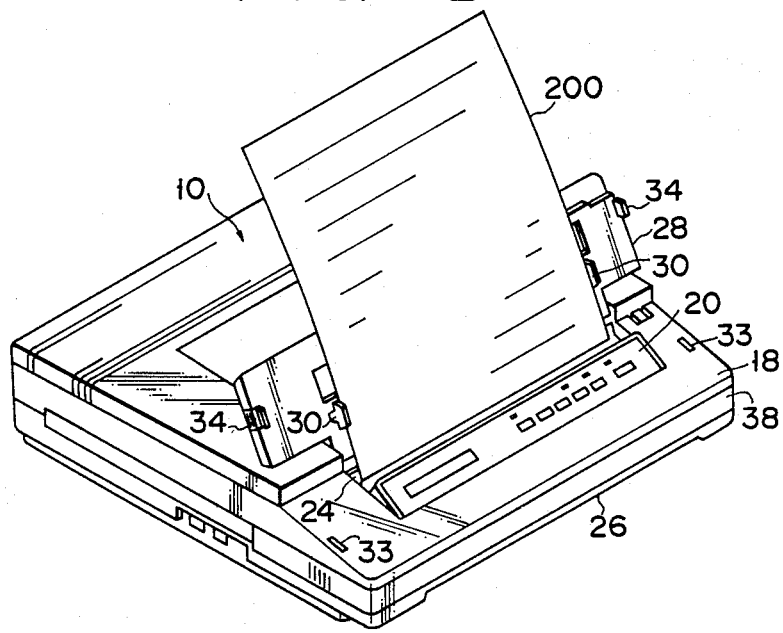
FIG. 3 is a perspective view schematically showing the outer appearance of the facsimile in FIG. 1 when an original is set on the original-supporting table.

In a facsimile having the above structure, when an image on an original is to be sent, original 200 is placed on the lower surface of open lid 28, and then a lower end of original 200 is inserted into original insertion port 24, as shown in FIG. 3. When start key 22a (FIG. 7) on operation panel 20 is depressed to set a sending mode in the above state, the output shaft of pulse motor 154 is rotated in a counterclockwise direction as shown by a solid arrow in FIG. 16. As a result, the last gear in gear train 156 is rotated in a counterclockwise direction as shown by a solid arrow. A rotational force of the last gear is transmitted to paper feed roller drive gear 74 and is transmitted to free-rotation drive gear 124 through a planetary gear revolved around the last gear by an inertial force. Therefore, paper feed roller 68 is rotated counterclockwise, and white roller 120 is rotated clockwise. Originals 200 in original insertion port 24 are fed one by one to original reading sensor unit 52 by paper feed roller 68. The original is moved by white roller 120 under image sensor 62, and is discharged from original discharge port 26, as indicated by an arrow in FIG. 13. While a sending mode is set in the facsimile, the rotational force from the output shaft of pulse motor 154 is transmitted to platen gear 148 through gear train 156. However, since one-way clutch 150 (FIG. 9) does not transmit the above rotational force to platen shaft 146, platen roller 142 is not rotated.

When a receiving mode is set in the facsimile, the output shaft of pulse motor 154 is rotated in a clockwise direction as shown by a broken arrow in FIG. 16. Therefore, gear train 156 causes platen gear 148 to rotate in a counterclockwise direction as shown by a broken arrow, and one-way clutch 150 (FIG. 9) causes platen roller 142 to rotate counterclockwise. Therefore, recording paper 40 is moved on thermal head 130 of printing unit 54 by the rotational force of platen roller 142 and is discharged from recording paper discharge port 172, as shown in FIG. 13. When recording paper 40 passes on thermal head 130 with recording paper 40 being pinched by thermal head 130 and platen roller 142, thermal head 130 performs printing on recording paper 40. At this time, the last gear of gear train 156 is rotated in a clockwise direction as shown by a dotted arrow in FIG. 16. Therefore, free-rotation drive gear 124 for white roller 120 is rotated counterclockwise. Since one-way clutch 126 (FIG. 9) does not transmit the counterclockwise rotational force of free-rotation drive gear 124 to white roller shaft 122 (FIG. 9), white roller 120 (FIG. 9) is not rotated in the receiving mode. Planetary gear 162 is biased by the inertial force to be revolved clockwise around the last gear of gear train 156. Since stopper 164 is engaged with planetary gear support member 160, as shown in FIG. 16, planetary gear 162 is held at a position between paper feed roller drive gear 74 and direct drive gear 128 for white roller 120 and spaced apart therefrom. Therefore, the rotational force of planetary gear 162 is neither transmitted to paper feed roller 68 nor to white roller 120 through direct drive gear 128.

In the facsimile described above, when an image on an original inserted into original insertion port 24 is copied on heat-sensitive recording paper 40, after the original is inserted into original insertion port 24, copy/journal selection key 22e of operation panel 20 (FIG. 7) is depressed to set a copy mode in the facsimile. Thereafter, as soon as start key 22a is depressed, the output shaft of pulse motor 154 is rotated in a counterclockwise direction as shown by a solid arrow in FIG. 16. Paper feed roller 68 is rotated counterclockwise by gear train 156 and planetary gear 162 so that the original in original insertion port 24 (FIG. 2) is fed toward original reading sensor unit 52. When the leading end of the original reaches at a contact line between white roller 120 and abutment member 78, i.e., at a position before image sensor 62, pulse motor 154 temporarily stops the rotation of the output shaft. Then, pulse motor 154 causes the output shaft to rotate in a clockwise direction as shown by a broken arrow. Therefore, platen roller 142 is rotated counterclockwise so that recording paper 40 is moved on thermal head 130 of printing unit 54. When a copy mode is set, solenoid 158 is operated to release the engagement between planetary gear support member 160 and stopper 164. As a result, planetary gear 162 is revolved clockwise around the last gear by an inertial force generated by rotation of the last gear of gear train 156 in a clockwise direction as shown by a dotted arrow in FIG. 16. The revolved planetary gear 162 is meshed with direct drive gear 128 for white roller 120, and causes white roller 120 to rotate clockwise. Therefore, the original moves under original reading sensor unit 52 upon rotation of white roller 120, and an image on the original is read. The read image is copied on heat-sensitive recording paper 40 by printing unit 54.

What is claimed is:

1. An original reading apparatus for causing a paper feed roller to feed an original inserted into an original insertion port of a main body cover to an image sensor unit, irradiating the original with light from said sensor unit, receiving light reflected by the original, and reading an image on the original, wherein roller support means is mounted on a sensor housing for said sensor unit to support said paper feed roller.

2. An apparatus according to claim 1, wherein said image sensor unit is a contact type image sensor which is brought into slidable contact with the original to read the image on the original, and said sensor housing is pivotally supported on said main body cover between a contact position where said image sensor unit is in contact with the original in an original path in said main body cover and a separated position where said image sensor unit is separated from the original.

3. An apparatus according to claim 2, wherein said roller support means is mounted on said main body cover so as to be coaxial with a pivot axis of said sensor housing.

4. An apparatus according to claim 3, wherein a rotating shaft of said paper feed roller functions as a rotating shaft of said sensor housing, so that said sensor housing is pivotal about the rotating shaft of said paper feed roller between the contact position and the separated position.

5. An apparatus according to claim 2, wherein said sensor housing is made of a synthetic resin, and said sensor housing comprises a plurality of reinforcing ribs formed at a plurality of positions so as to separate from each other in a direction parallel to the axis of rotation thereof, said plurality of reinforcing ribs extending in a feed direction of the original in the original path.

6. An apparatus according to claim 5, wherein said plurality of reinforcing ribs serve as original guides for guiding the original from said paper feed roller to said image sensor unit upon slidable contact with the original in the original path when said sensor housing is located at the contact position.

* * * * *